United States Patent
Muehlfeld et al.

(10) Patent No.: US 10,005,506 B2
(45) Date of Patent: Jun. 26, 2018

(54) SUSPENSION ARRANGEMENTS FOR VEHICLES

(71) Applicant: Great Lakes Sound & Vibration, Inc., Houghton, MI (US)

(72) Inventors: Christian Michael Muehlfeld, Chassell, MI (US); Gerald Ball, Hancock, MI (US)

(73) Assignee: Great Lakes Sound & Vibration, Inc., Houghton, MI (US)

( * ) Notice: Subject to any disclaimer, the term of this patent is extended or adjusted under 35 U.S.C. 154(b) by 113 days.

(21) Appl. No.: 15/051,976

(22) Filed: Feb. 24, 2016

(65) Prior Publication Data
US 2016/0251043 A1    Sep. 1, 2016

Related U.S. Application Data

(60) Provisional application No. 62/121,850, filed on Feb. 27, 2015.

(51) Int. Cl.
| | | |
|---|---|---|
| *B62D 55/07* | (2006.01) | |
| *B62D 55/108* | (2006.01) | |
| *B62M 27/02* | (2006.01) | |

(52) U.S. Cl.
CPC .......... *B62D 55/108* (2013.01); *B62D 55/07* (2013.01); *B62M 27/02* (2013.01); *B62M 2027/026* (2013.01)

(58) Field of Classification Search
CPC . B62D 55/108; B62D 55/07; B62M 2027/026
See application file for complete search history.

(56) References Cited

U.S. PATENT DOCUMENTS

| | | |
|---|---|---|
| 1,916,375 A | 7/1933 | Knickerbocker |
| 3,773,126 A | 11/1973 | Irvine |
| 3,840,083 A | 10/1974 | Woods |
| (Continued) | | |

FOREIGN PATENT DOCUMENTS

WO    2013016128    1/2013

OTHER PUBLICATIONS

Kaduce, Larry A., Scorpion and Trailroamer Bite the Dust; Aug. 1, 2001, http://www.grovetontrailblazers.com/news/trailroamerl.htm, pp. 1-3, last visited on Oct. 1, 2002 10:52 AM.
(Continued)

*Primary Examiner* — Joseph M Rocca
*Assistant Examiner* — Michael R Stabley
(74) *Attorney, Agent, or Firm* — Andrus Intellectual Property Law, LLP

(57) ABSTRACT

A suspension assembly is provided for use with a vehicle having a chassis enclosing a drive system for rotatably driving a closed-loop track. The suspension assembly includes at least one elongated ground contact engaged with the closed-loop track, and an elongated swing arm angularly disposed in the closed-loop track. The swing arm extends between a front end portion adapted to be coupled to the chassis, and a rear end portion coupled to the at least one ground contact. A mounting arrangement is coupled to the swing arm for permitting at least rotation of the swing arm about a pivot axis extending longitudinally of the at least one ground contact wherein the mounting arrangement includes a wire rope mount.

10 Claims, 15 Drawing Sheets

(56) References Cited

U.S. PATENT DOCUMENTS

| | | | |
|---|---|---|---|
| 3,879,092 A | 4/1975 | Rose | |
| 3,887,023 A | 6/1975 | Henning | |
| 4,190,227 A * | 2/1980 | Belfield | F16F 7/14 |
| | | | 248/618 |
| 4,407,386 A | 10/1983 | Yasui et al. | |
| 4,502,560 A | 3/1985 | Hisatomi | |
| 4,854,556 A | 8/1989 | Pietrzak | |
| 5,014,805 A | 5/1991 | Uchida | |
| 5,062,507 A | 11/1991 | Roche | |
| 5,113,958 A | 5/1992 | Holden | |
| 5,265,692 A | 11/1993 | Mallette | |
| 5,549,285 A * | 8/1996 | Collins | F16F 7/14 |
| | | | 248/570 |
| 5,667,031 A | 9/1997 | Karpik | |
| 5,692,579 A | 12/1997 | Peppel et al. | |
| 5,727,643 A | 3/1998 | Kawano et al. | |
| 5,860,486 A | 1/1999 | Boivin et al. | |
| 5,881,834 A | 3/1999 | Karpik | |
| 5,897,093 A | 4/1999 | Le Derf | |
| 5,944,134 A | 8/1999 | Peppel et al. | |
| 6,032,752 A | 3/2000 | Karpik et al. | |
| 6,032,754 A | 3/2000 | Izumi et al. | |
| 6,070,683 A | 6/2000 | Izumi et al. | |
| 6,120,014 A * | 9/2000 | Lee | F16F 7/14 |
| | | | 267/136 |
| 6,234,263 B1 | 5/2001 | Boivin et al. | |
| 6,234,264 B1 | 5/2001 | Boivin et al. | |
| 6,237,706 B1 | 5/2001 | Karpik et al. | |
| 6,263,991 B1 | 7/2001 | Savage et al. | |
| 6,290,217 B1 | 9/2001 | Schneider et al. | |
| 6,299,150 B1 | 10/2001 | Allen et al. | |
| 6,321,864 B1 | 11/2001 | Forbes | |
| 6,354,389 B1 | 3/2002 | Zackowski et al. | |
| 6,357,543 B1 | 3/2002 | Karpik | |
| 6,390,219 B1 | 5/2002 | Vaisanen | |
| 6,394,204 B1 | 5/2002 | Haringer | |
| 6,406,011 B1 | 6/2002 | Kosar et al. | |
| 6,443,512 B1 * | 9/2002 | Van Rees | B60R 19/18 |
| | | | 267/139 |
| 6,502,651 B2 | 1/2003 | Zackowski et al. | |
| RE38,124 E | 5/2003 | Mallette et al. | |
| 6,631,778 B2 | 10/2003 | Mallette | |
| 6,926,108 B1 | 8/2005 | Polakowski et al. | |
| 6,991,057 B2 | 1/2006 | Imamura et al. | |
| 7,128,180 B2 | 10/2006 | Polakowski et al. | |
| 7,581,738 B1 * | 9/2009 | Hartzell | A47B 81/00 |
| | | | 211/162 |
| 7,594,557 B2 | 9/2009 | Polakowski et al. | |
| 7,852,274 B2 * | 12/2010 | Madden, Jr. | H01Q 1/1207 |
| | | | 343/713 |
| 8,167,073 B2 | 5/2012 | Polakowski et al. | |
| 8,360,449 B2 | 1/2013 | Polakowski et al. | |
| 8,640,593 B2 | 2/2014 | Hazan | |
| 9,090,297 B2 * | 7/2015 | Mallette | B62D 55/104 |
| 2008/0055170 A1 | 3/2008 | Madden, Jr. et al. | |
| 2013/0068918 A1 * | 3/2013 | Mulder | F16F 7/14 |
| | | | 248/570 |
| 2014/0202784 A1 * | 7/2014 | Mallette | B62D 55/104 |
| | | | 180/190 |
| 2015/0034404 A1 | 2/2015 | Polakowski et al. | |
| 2016/0121970 A1 * | 5/2016 | Labbe | B62M 27/02 |
| | | | 180/193 |

OTHER PUBLICATIONS

Track Suspension Today, The Adjustables, Part 1: Origin and Nomenclature; Supertrax International, Fall 2002, pp. 45-49.
Trail Roamer, Marine Hunting and Outdoor Magazine, pp. 1-3, http://www.sportingjournal.com/main18.shtml, last visited Oct. 1, 2002.
Mountain Addiction Billet Suspension, see www.mountainaddiction.com/pages/l/index.htm, last visited Jun. 9, 2006.
Adboivin Expert, see www.adboivin.com/en/expert.html, last visited Jun. 9, 2006.
International Search Report and Written Opinion for PCT/US2014/048830, dated Oct. 25, 2014.
International Preliminary Report on Patentability and Written Opinion for International Application No. PCT/US2014/048830 dated Feb. 11, 2016.

* cited by examiner

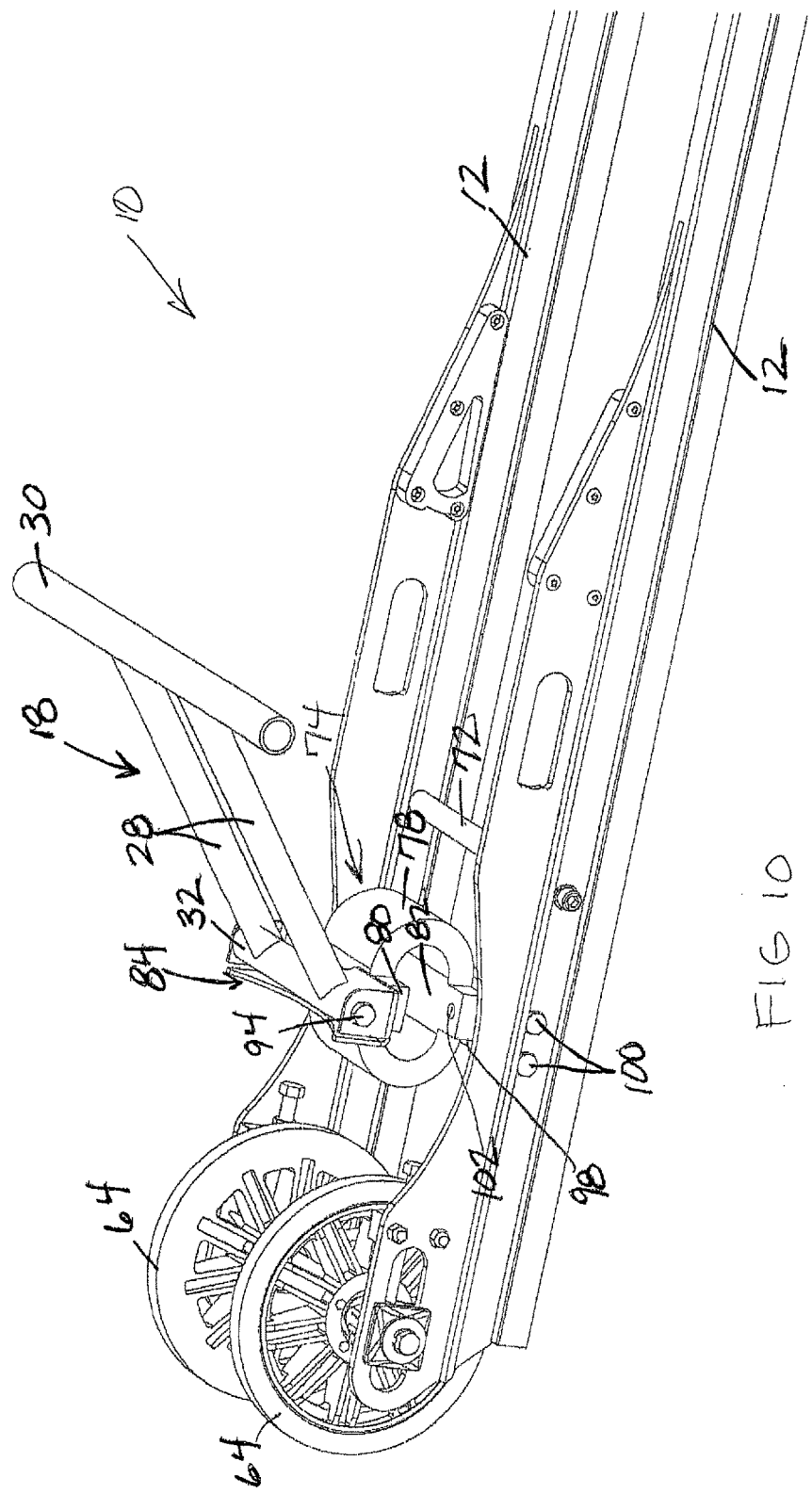

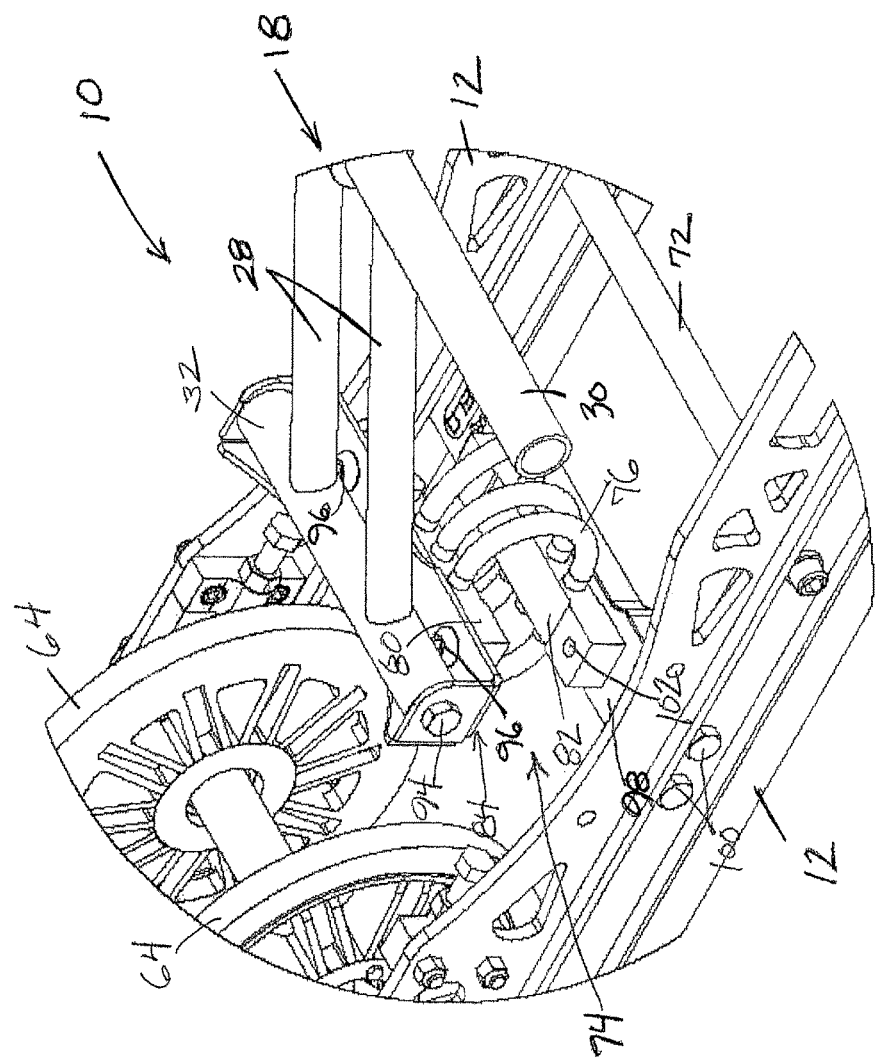

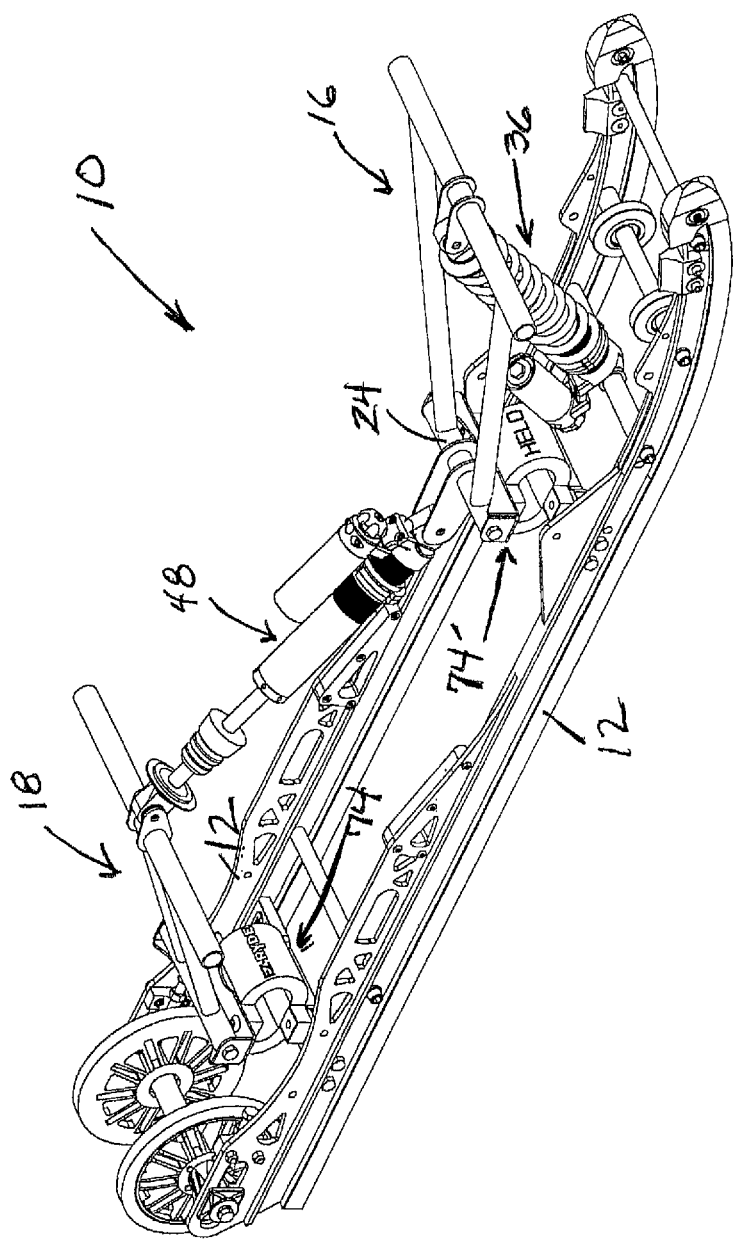

SUSPENSION ARRANGEMENTS FOR VEHICLES

CROSS REFERENCE TO RELATED APPLICATION

The present utility application relates to and claims priority of U.S. Provisional Patent Application Ser. No. 62/121,850 filed Feb. 27, 2015, the disclosure of which is incorporated herein by reference in entirety.

FIELD

The present disclosure relates to suspension arrangements for vehicles, including off-road vehicles, all terrain vehicles, snowmobiles, snow bikes and/or the like. More particularly, the present disclosure pertains to a rear suspension arrangement for a snowmobile.

BACKGROUND

U.S. Patent Application Publication No. 2015/0034404, which is incorporated herein by reference in entirety, discloses a suspension assembly adapted for use in a snowmobile having a closed-loop track includes at least one ground contact engaged with the closed-loop track. An elongated swing arm is angularly disposed in the closed-loop track and extends between a front end portion adapted to be coupled to the chassis, and a rear end portion coupled to the at least one ground contact. A front resilient member is disposed in the closed-loop track and has an upper end pivotably coupled to the front end portion of the swing arm, and a lower end pivotably coupled to the at least one ground contact. A rear resilient member is disposed in the closed-loop track and has an upper end adapted to be pivotally coupled to the chassis, and a lower end pivotally coupled to the at least one ground contact. A pivot arrangement is connected to the swing arm for permitting at least rotation of the swing arm about a pivot axis extending longitudinally of the at least one ground contact. The pivot arrangement includes an arrangement for restricting and/or preventing rotation of the swing arm.

U.S. Pat. No. 8,360,449, which is incorporated herein by reference in entirety, discloses a suspension assembly for a land vehicle comprising a spindle having a steering axis for the land vehicle and configured to pivotably couple to a ground contact; an upper pivotable member having an inboard end configured to pivotably couple to the land vehicle and an outboard end pivotably coupled to the spindle; a lower pivotable member having an inboard end configured to pivotably couple to the land vehicle and an outboard end pivotably coupled to the spindle; a resilient member having an upper end configured to pivotably couple to the land vehicle and a lower end pivotably coupled to the spindle; a caster adjustment mechanism adjusting the position of one of the upper pivotable member and the lower pivotable member relative to the spindle to thereby adjust caster; and a camber adjustment mechanism adjusting the position of one of the upper pivotable member and the lower pivotable member relative to the spindle to thereby adjust camber.

U.S. Pat. Nos. 8,167,073 and 7,594,557, which are incorporated herein by reference in entirety, disclose a suspension assembly for a snowmobile that rotatably supports a closed-loop track in the rear tunnel of the snowmobile and also supports both vertical and horizontal travel of the closed-loop track during suspension system travel. The suspension assembly includes at least one elongated ground contact that supports rotational travel of the closed-loop track. At least one swing arm is angularly disposed in the closed-loop track and has a front end portion pivotably coupled to the rear tunnel, and a rear end portion coupled to the at least one ground contact. In the preferred embodiment, a front resilient member is arranged to bias against displacement between the chassis and the at least one ground contact during suspension assembly travel, and a rear resilient member is arranged to bias against displacement between the chassis and the swing arm during suspension assembly travel. A tensioner couples the rear portion of the swing arm to the at least one ground contact. The tensioner is extendable and retractable during movement of the suspension assembly to maintain the closed-loop track at a generally uniform tension during assembly movement.

SUMMARY

The present disclosure deals with control and maneuverability issues associated with single track suspension systems in which ground forces acting on the lower portion of the suspension assembly during snowmobile use must travel through the longitudinal or fore-aft axis of the system before affecting the snowmobile axis and the rider. Known single track suspension designs do not adequately address such ground forces and result in decreased handling, performance and ride comfort. In contrast, the suspension assembly disclosed herein provides desirable results when single track suspension systems are subject to random angular displacement which causes rotation of suspension elements about the fore-aft axis of the system.

During research and experimentation, the present inventors found that incorporating a wire rope mount into a conventional suspension assembly for a vehicle surprisingly provides the following benefits:

Increases suspension travel during translation and rotation in all directions

Allows the rear end of the suspension to rotate

Provides improved control of weight transfer on the suspension

Provides additional damping to the suspension

Prevents the suspension from bottoming out, thus preventing sharp jolts to the driver Structure of the wire rope mount can be finely tuned to provide wide ranges of performance capabilities.

The present disclosure relates to a suspension assembly adapted for use with a vehicle having a chassis enclosing a drive system for rotatably driving a closed-loop track, the suspension assembly comprising at least one elongated ground contact engaged with the closed-loop track, an elongated swing arm angularly disposed in the closed-loop track, the swing arm extending between a front end portion adapted to be coupled to the chassis, and a rear end portion coupled to the at least one ground contact, and a mounting arrangement coupled to the swing arm for permitting at least rotation of the swing arm about a pivot axis extending longitudinally of the at least one ground contact wherein the mounting arrangement includes a wire rope mount.

The present disclosure also relates to a suspension assembly adapted for use with a snowmobile having a chassis enclosing a drive system for rotatably driving a closed-loop track. The suspension assembly includes at least one elongated ground contact engaged with the closed-loop track. A front swing arm is angularly disposed in the closed-loop track, and extends between a front end portion adapted to be coupled to the chassis, and a rear end portion coupled to the at least one ground contact. A rear swing arm is angularly disposed in the closed-loop track, and extends between a front end portion adapted to be coupled to the chassis, and a rear end portion coupled to the at least one ground contact. A front resilient member is disposed in the closed-loop track, and has an upper end coupled to the front end portion of the front swing arm, and a lower end coupled to the at least one ground contact. A rear resilient member is disposed in the closed-loop track, and has an upper end coupled to the front end portion of the rear swing arm, and a lower end coupled to the at least one ground contact. A wire rope mount is coupled to the rear end portion of the rear swing arm and the at least one ground contact for permitting at least rotation of the rear swing arm about a pivot axis extending longitudinally of the at least one ground contact.

The present disclosure further relates to a kit adapted for use with a suspension assembly for a vehicle having a chassis enclosing a drive system for rotatably driving a closed-loop track, the suspension assembly including at least one elongated ground contact engaged with the closed-loop track, an elongated swing arm angularly disposed in the closed-loop track, the swing arm extending between a front end portion coupled to the chassis, and a rear end portion coupled to the at least one ground contact. The kit includes at least one wire rope element, a first mounting element connected to an upper end of the at least one wire rope element, and adapted to be attached to the rear end portion of the swing arm, and a second mounting element connected to a lower end of the at least one wire rope element, and adapted to be attached to the at least one ground contact.

BRIEF DESCRIPTION OF THE DRAWINGS

FIGS. 9 and 10 are further partial perspective views of the suspension assembly shown in FIG. 6.

FIG. 11 is a partial perspective view of the rear portion of the suspension assembly showing an alternate embodiment of the wire rope mount.

FIGS. 14 and 15 are perspective views of the suspension assembly showing further alternative embodiments of the wire rope mount.

DETAILED DESCRIPTION OF THE INVENTION

The present disclosure relates to a suspension assembly for use in a snowmobile wherein at least rotation of a swing arm is permitted about a pivot axis extending longitudinally of at least one ground contact.

FIGS. 1-5 illustrate a known conventional suspension assembly 10 which is adapted to be disposed for articulation within a closed-loop track that is rotatably driven by a drive system of the snowmobile to propel the snowmobile in a desired direction as is well known. The suspension assembly 10 is designed to articulate during travel of the snowmobile, and is arranged to provide tension in the rotating track and yet allow for increased contact between the track and the ground over rough terrain and during snowmobile acceleration and deceleration.

A lower portion of the suspension assembly has a pair of elongated skid rails or ground contacts 12 upon which the closed-loop track rides. Although two ground contacts are shown, it is conceived that the suspension assembly 10 could be formed with a single ground contact or more than two ground contacts. In the example shown, the ground contacts 12 are longitudinal members having curved forend tips 14, and each ground contact 12 lies within the closed-loop track. As is known, as the closed-loop track is driven by the drive system of the snowmobile, an inner surface of the track slides along the length of the ground contacts 12. Bearing the weight of the snowmobile, the ground contacts 12 apply pressure to the inner surface of the closed-loop track, and apply pressure to the ground thus resulting in motion of the snowmobile.

Figure 1:
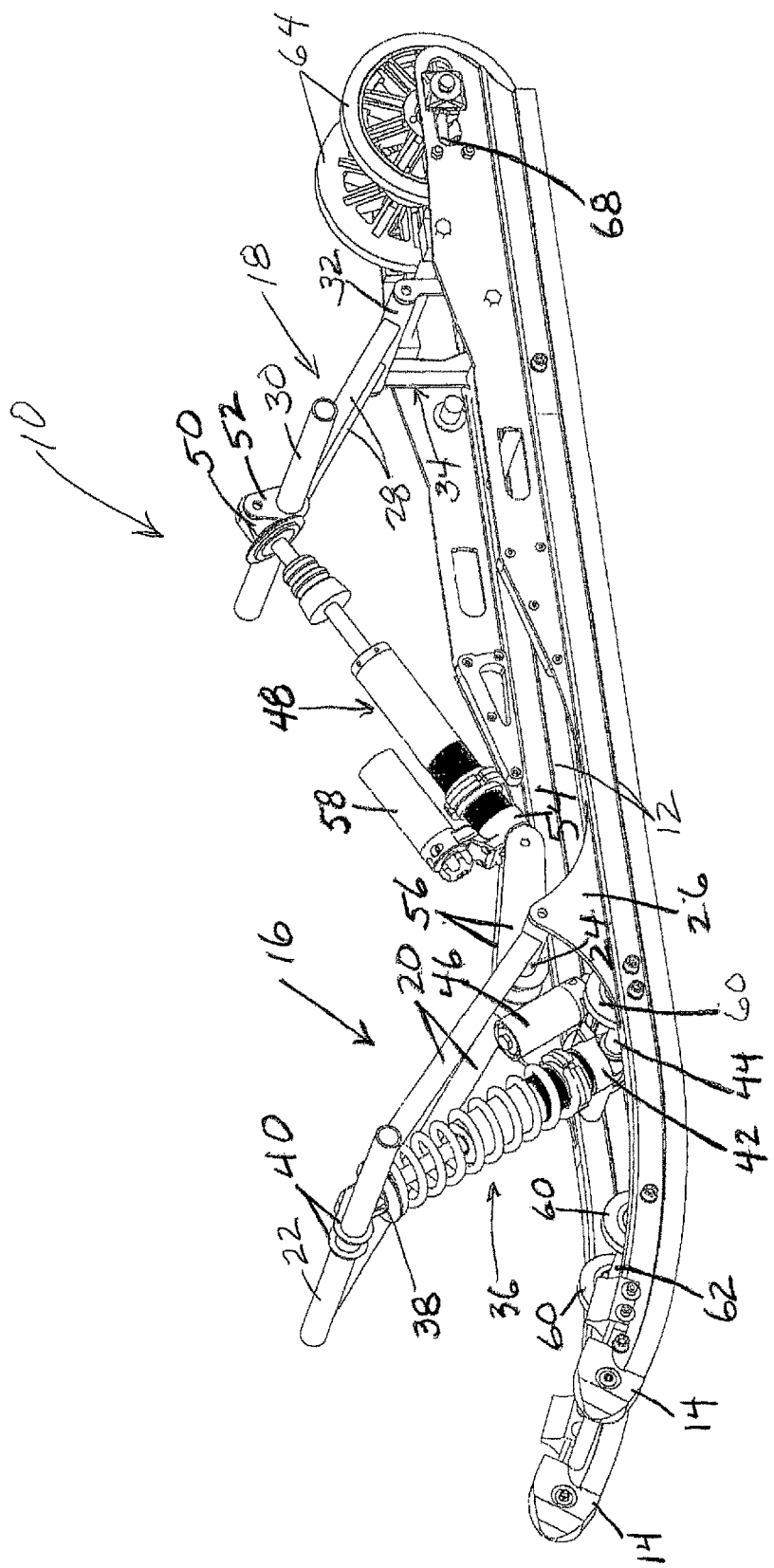
FIG. 1 is a perspective view of a prior art conventional suspension assembly for a snowmobile.
Figure 2:
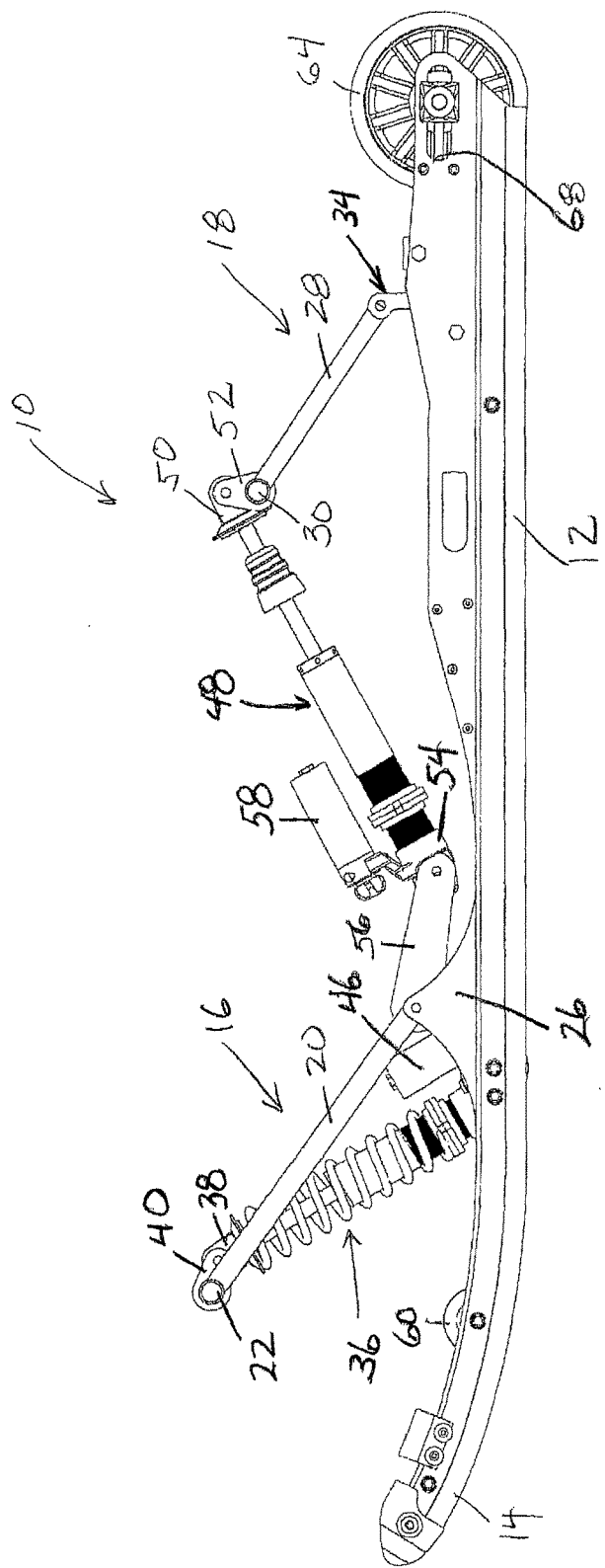
FIG. 2 is an elevational view of the prior art suspension assembly shown in FIG. 1.
Figure 3:
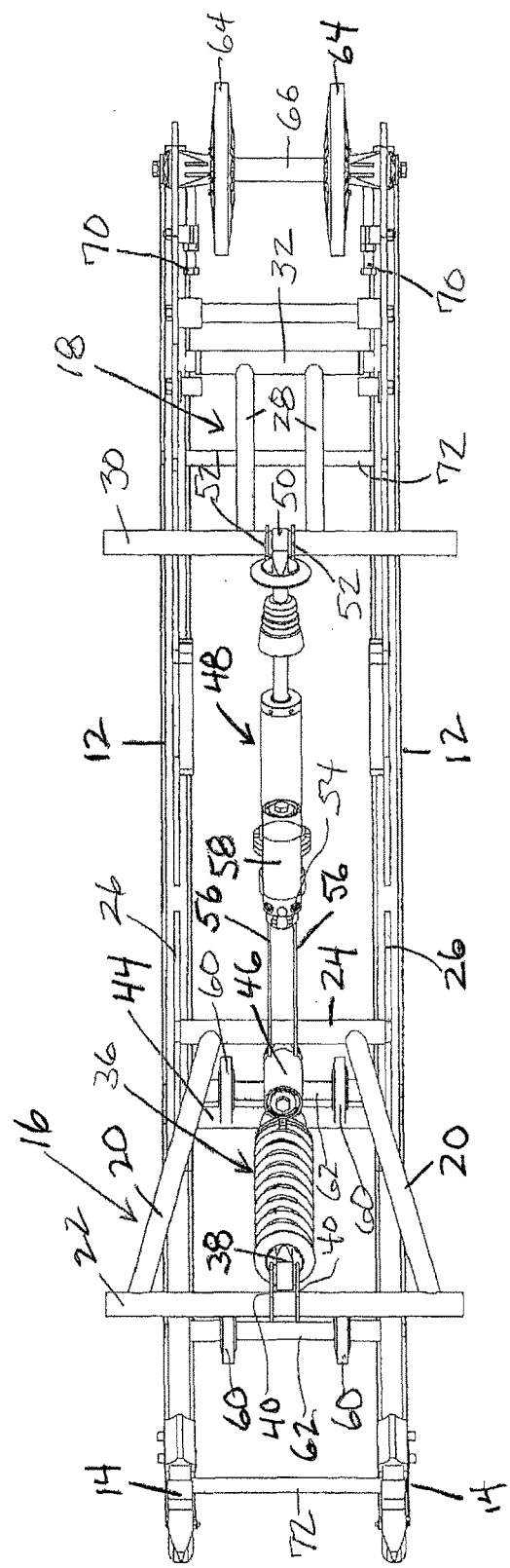
FIG. 3 is a top view of the prior art suspension assembly shown in FIG. 1.
Figure 4:
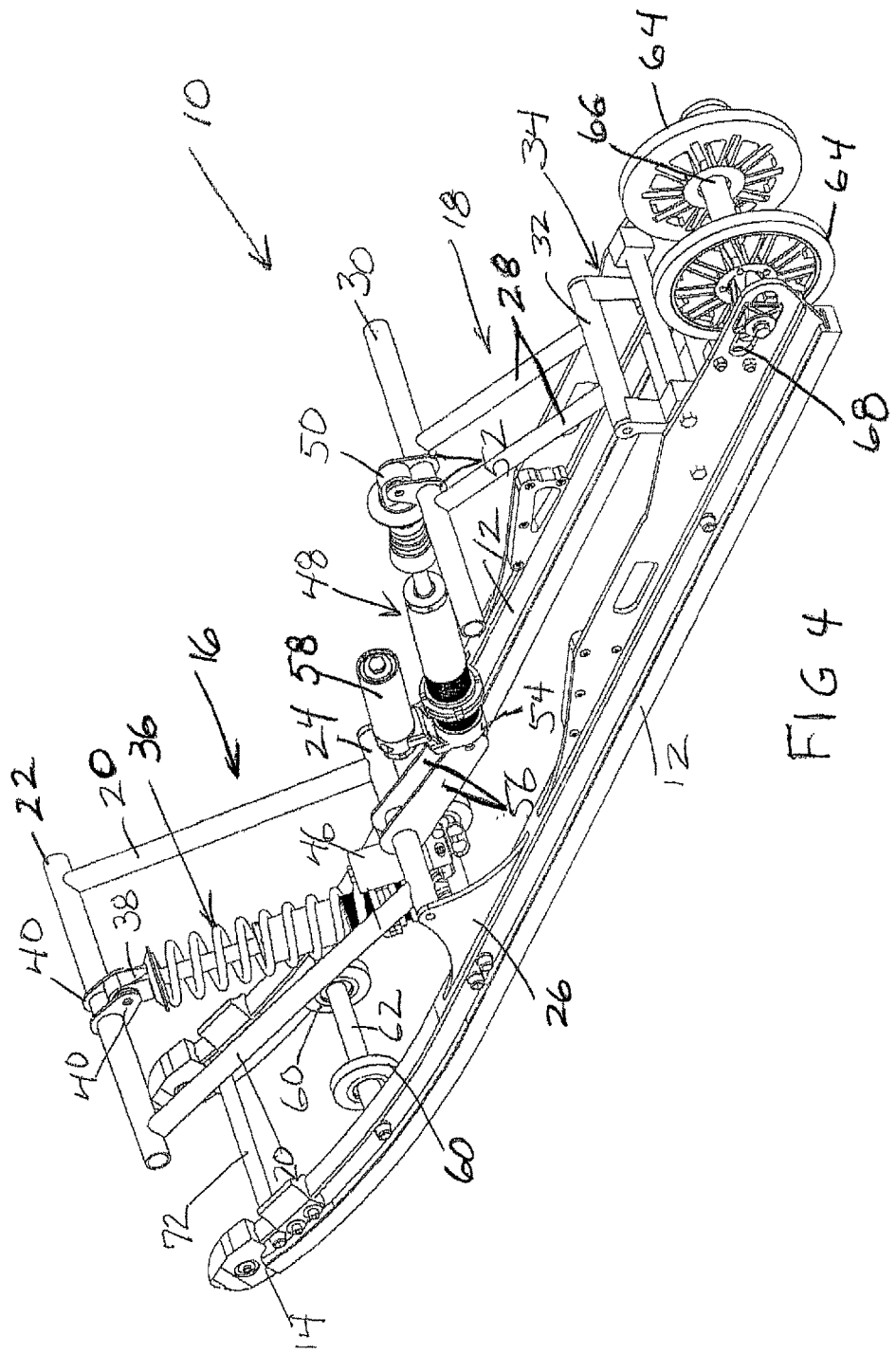
FIGS. 4 and 5 are further perspective views of the prior art suspension assembly shown in FIG. 1.
Figure 5:
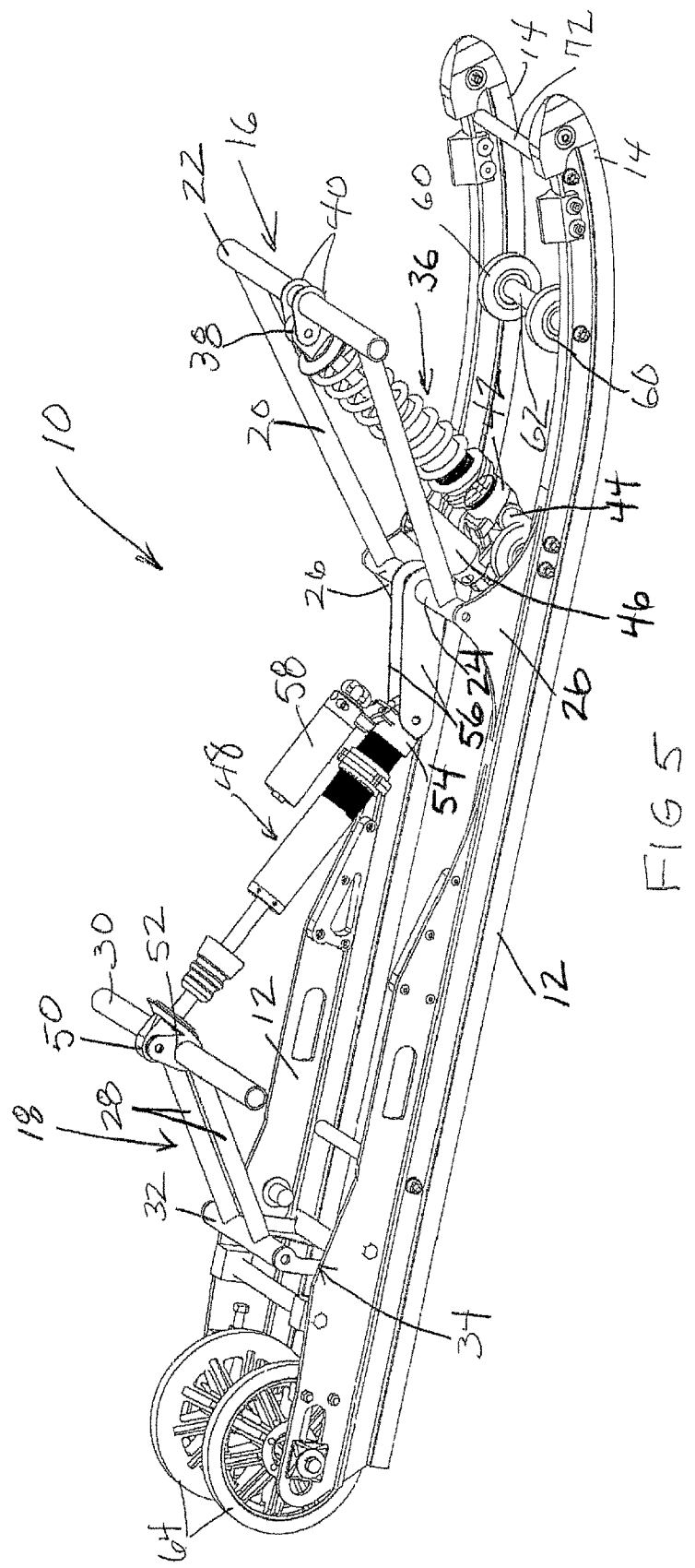

The suspension assembly 10 includes a suspension linkage which includes a suspension arm arrangement which is designed to transfer suspension weight and moment among various linkages to support the snowmobile and provide a smooth ride. In the example shown, the suspension arm arrangement is formed by a front torque arm arrangement defining a front swing arm 16 and a rear torque arm arrangement defining a rear swing arm 18, both of which extend at an angle downwardly and rearwardly in the suspension assembly 10. The front swing arm 16 has a pair of front torque arms 20 which are rigidly joined at upper ends thereof to outer ends of a front upper cross shaft 22 defining a front end portion designed to be pivotally coupled to the chassis of the snowmobile. The front torque arms 20 are fixedly secured at lower ends thereof to a front lower cross shaft 24 defining a rear end portion. The front lower cross shaft 24 has outer ends which are pivotally connected to upstanding mounting plates 26 fixed on the ground contacts 12. As best seen in FIG. 3, the front torque arms 20 extend in converging relationship between the front upper cross shaft 22 and the front lower cross shaft 24. The rear swing arm 18 has a pair of rear torque arms 28 which are parallel with one another, and are rigidly secured at upper ends thereof to a rear upper cross shaft 30 defining a front end portion adapted to be pivotally connected to the chassis of the snowmobile. The rear torque arms 28 are fixedly attached at lower ends thereof to a rear lower cross shaft 32 defining a rear end portion. The rear lower cross shaft 32 is pivotally secured between opposite sides of a raised suspension link 34 swingably coupled to and between the ground contacts 12.

A front resilient member 36 extends downwardly and rearwardly in the suspension assembly 10. In the example shown, the front resilient member 36 is a spring and/or shock absorber which biases against displacement between the front torque arms 20 and the pair of ground contacts 12 during suspension travel to resiliently support and dampen movement of the track and soften the ride of the snowmobile. The front resilient member 36 has a first upper end 38 which is pivotally attached to a pair of links 40 fixedly mounted on the front upper cross shaft 22. The front resilient member 36 has a second or lower end 42 which is mounted for rotation about a crossbar 44 extending between the ground contacts 12. The lower end 42 is placed in fluid communication, such as by a coupler, with an external reservoir 46 that contains an internal piston.

A rear resilient member 48 extends upwardly and rearwardly in the suspension assembly 10. The rear resilient member 48 is a spring and/or shock absorber which biases against displacement between the rear upper cross shaft 30 and the pair of ground contacts 12 during travel of the snowmobile to resiliently support and dampen movement of the track and to soften the ride of the snowmobile. The rear resilient member 48 has a first upper end 50 which is pivotally attached to a pair of links 52 fixedly mounted on the rear upper cross shaft 30. The rear resilient member 48 has a second or lower end 54 which is pivotally connected to rear ends of a pair of movable links 56. The links 56 have front ends which are fixedly mounted to the front lower cross shaft 24. The lower end 54 is placed in communication, such as by a coupler, with an external reservoir 58 that contains an internal piston.

Several idler wheels are provided to assist in translation of the track along the ground contacts 12. More specifically, sets of front idler wheels 60 are rotatably mounted on cross shafts 62 inboard of the ground contacts 12. A pair of rear idler wheels 64 is rotatably mounted on a shaft 66 (FIG. 3) extending between the ground contacts 12. The rear idler wheels 64 can be moved back and forth relative to slots 68 formed in the rear of the ground contacts 12 such as by using adjustment bolts 70 (FIG. 3) so as to adjust tension on the track at the rear of the suspension assembly 10. Support bars 72 (FIG. 3) extend between the ground contacts 12 to provide stability therebetween during snowmobile travel.

As will be understood hereafter, it has been discovered that various performance characteristics of the suspension assembly 10 described above can be significantly enhanced by incorporating a mounting arrangement in the form of at least one resilient wire rope mount 74, 74', 74" within the suspension assembly 10 to permit at least rotation or twisting of at least one swing arm about a pivot axis extending longitudinally of the at least one ground contact.

In one example shown in FIGS. 6-11, a rear end of the suspension assembly 10 is modified by replacing the conventional suspension link 34 with the wire rope mount 74 which is positioned between the rear end portion of the rear swing arm 18 and the ground contacts 12. The wire rope mount 74 typically includes a resilient wire rope element 76 (FIG. 11) which is preferably encapsulated in a rubber elastomeric material 78, but may be employed by itself without the elastomeric material 78. The wire rope element 76 is typically formed of a segment of helically wound, multi-strand wire cable in which each turn of the wire cable is captured in diametrically opposite zones in respective upper and lower mounting blocks 80, 82. The helical formation imparts an elastic quality to the wire cable causing it to flex and contract in a spring-like manner when subject to a dynamic load. This, in turn, allows the mounting blocks 80, 82 to move relative to one another dissipating energy in the process. While the wire rope element 76 by itself provides for omnidirectional damping, it has been found that embedding or encapsulating the wire rope element 76 in an overmolded mass of the elastomeric material 78 significantly improves the damping effect of the wire rope element 76 without adding substantial weight and volume thereto.

Figure 6:
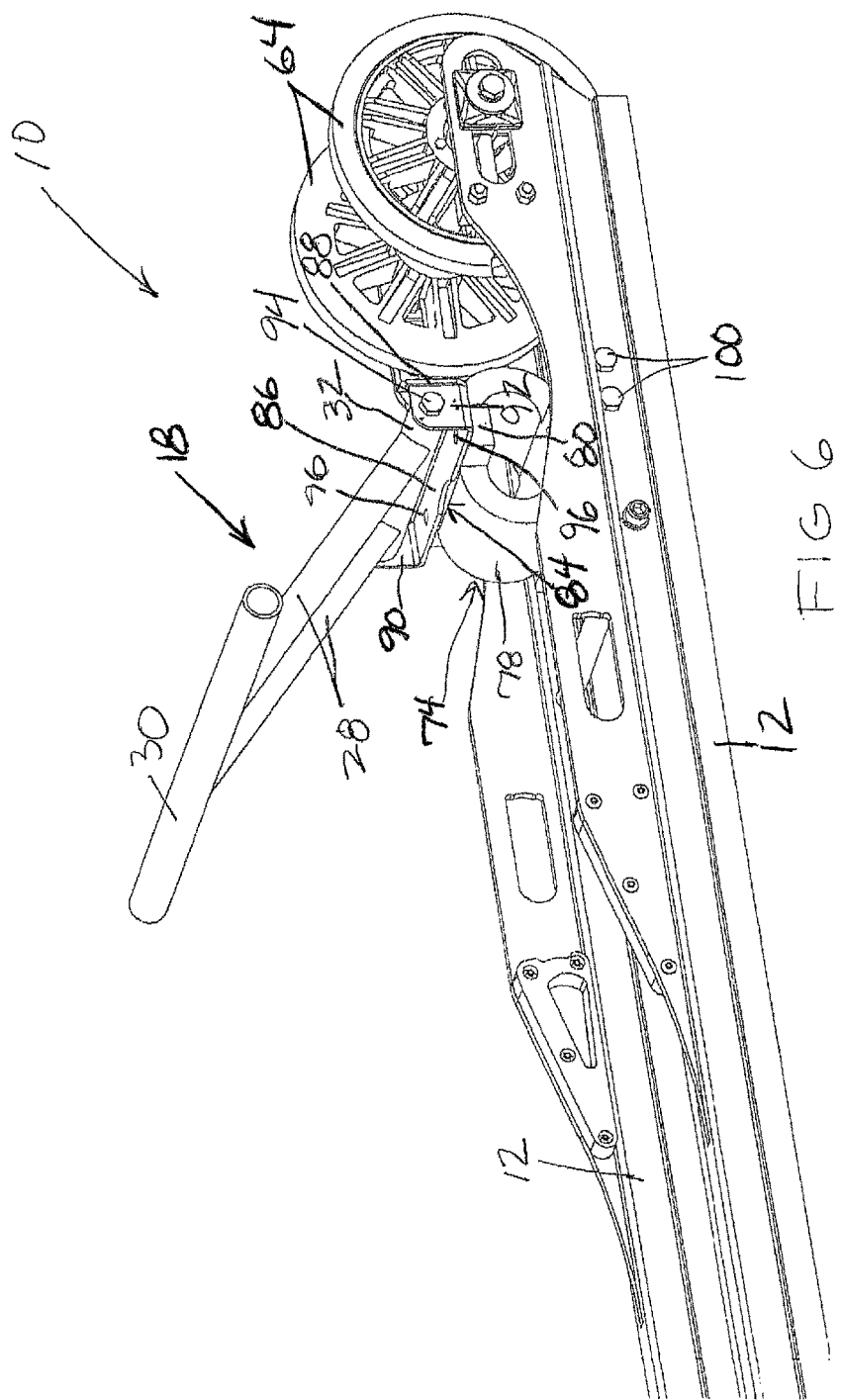
FIG. 6 is a partial perspective view of the rear portion of the suspension assembly shown in FIG. 1 modified to include a wire rope mount in accordance with the present disclosure.
Figure 7:
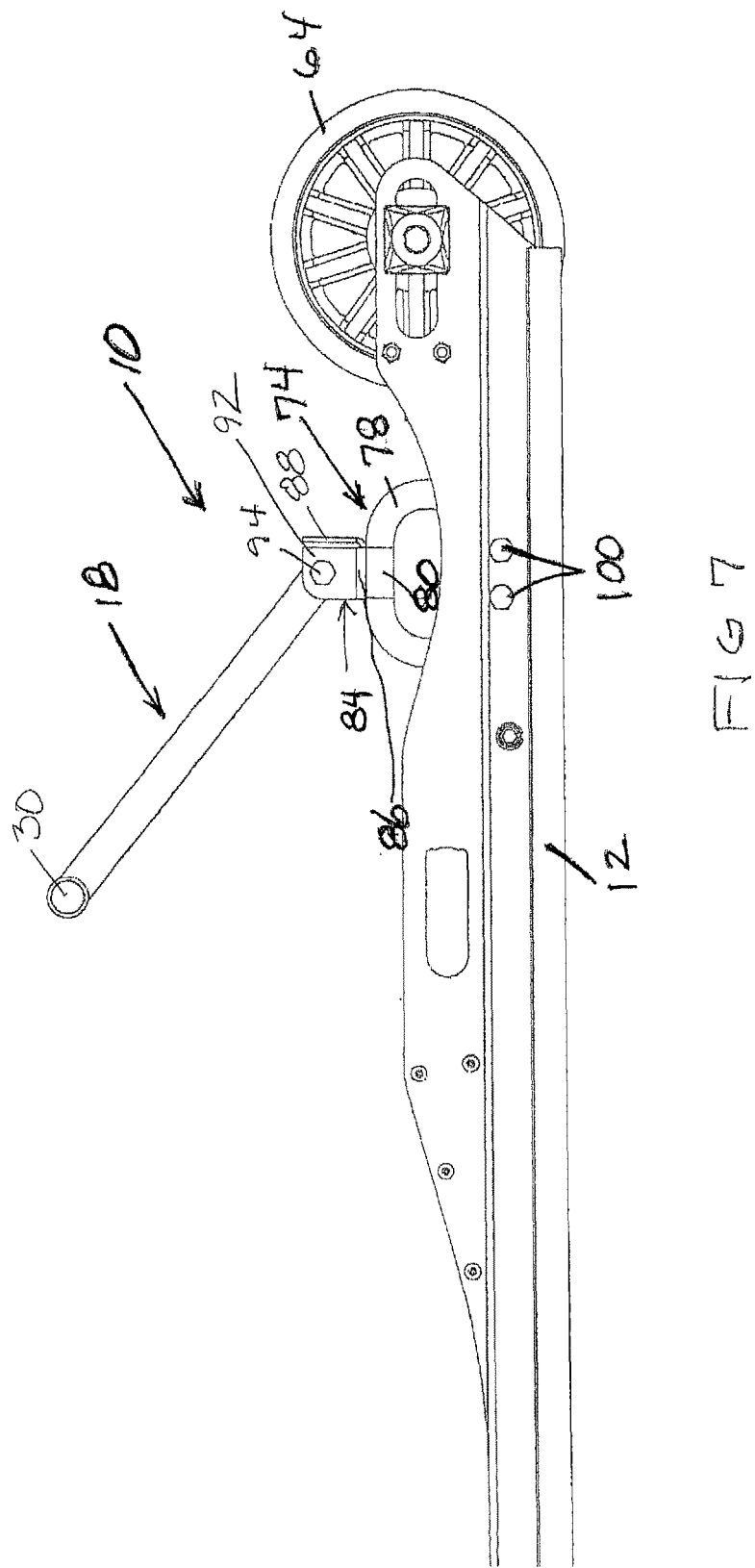
FIG. 7 is a partial elevational view of the suspension assembly shown in FIG. 6.
Figure 8:
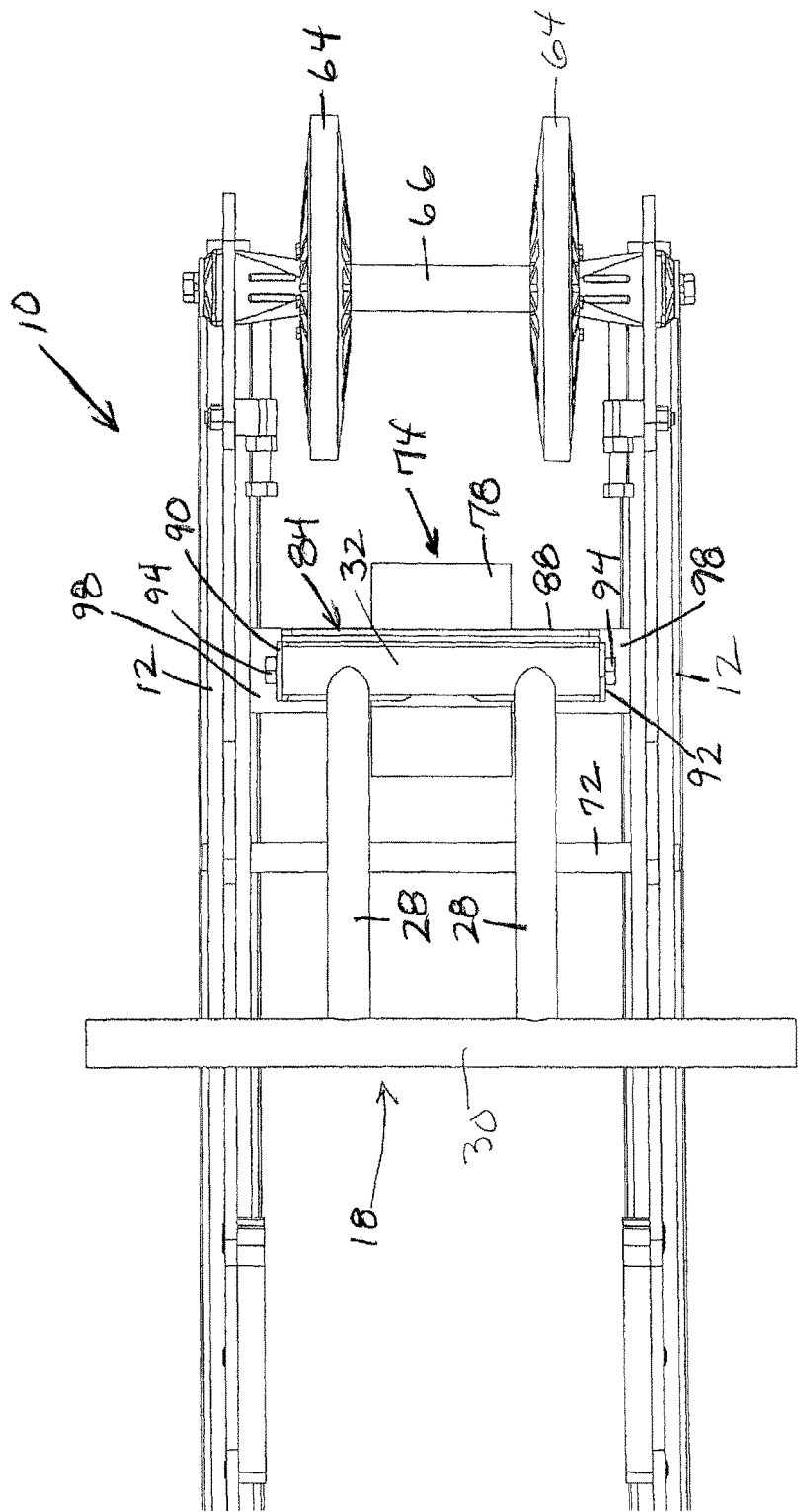
FIG. 8 is a partial top view of the suspension assembly shown in FIG. 6.

As seen in FIGS. 6-11, the wire rope mount 74 further includes a first mounting element defined by an upper mounting cradle 84 having a planar base 86 provided with a rear wall 88 and a pair of opposite end walls 90, 92 rising from the base 86. The upper mounting cradle 84 is configured to receive and retain the rear lower cross shaft 32 of the rear swing arm 18. Fasteners 94 pass through the end walls 90, 92 into opposite ends of the cross shaft 32 so that the cross shaft 32 is pivotally mounted in the upper mounting cradle 84. As seen in FIG. 6, additional fasteners 96 are passed through holes in the base 86, and screwed into laterally extending portions of the upper mounting block 80. The wire rope mount 74 also includes a second mounting element defined by a lower mounting bar 98 which extends between inner surfaces of the ground contacts 12, and is fixed thereto by bolts 100. Laterally extending portions of the lower mounting block 82 are secured to an upper surface of the lower mounting bar 98 by fasteners 102.

In accordance with the present disclosure, the wire rope mount 74 is configured to provide relative rotational freedom of the rear swing arm 18 and the ground contacts 12 about a pivot axis A (FIG. 9) extending longitudinally of the ground contacts 12 to improve handling and performance of the snowmobile. That is, the resiliency of the wire rope mount 74 permits at least rotation or twisting of the rear swing arm 18 about the pivot axis A as represented by the arrows B. Such rotation is in addition to the rotation of the rear swing arm 18 at its upper end about the transverse axis of the rear upper cross shaft 30.

Figure 9:
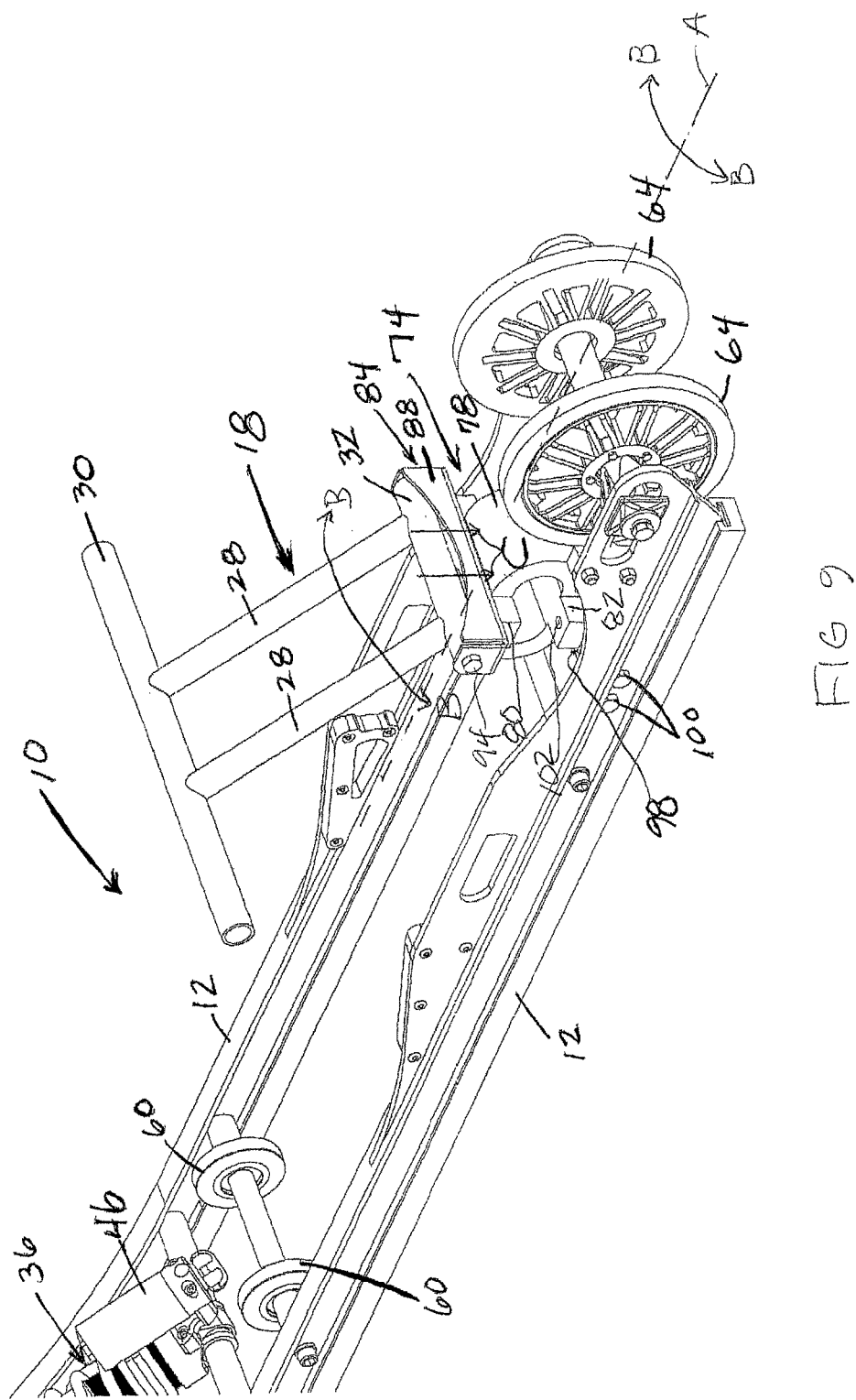

In addition to enabling rotation or twisting of the rear swing arm 18 about the pivot axis A, the resilient wire rope element 76, either by itself or encapsulated with the elastomeric material 78 is also compressible upon loading of the swing arm 18 as represented by the arrows C in FIG. 9. Upon release of the loading on swing arm 18, the wire rope element 76, by itself or coated with the elastomeric material 78, expands to its initial state.

It should be appreciated that the provision of the wire rope mount 74 and the suspension assembly 10 provides for increased suspension travel including translation and rotation in different directions, and allows relative rotation between the swing arm 18 and the ground contacts 12, in the suspension assembly 10. Also, the wire rope mount 74 improves control of weight transfer and provides additional damping for the suspension assembly 10. The wire rope mount 74 has been shown to prevent the snowmobile suspension from bottoming out and minimizes sharp jolts to the snowmobile driver. It should be further understood that the wire rope mount 74 can be tuned to provide wide ranges of performance capabilities as desired.

Figure 16:
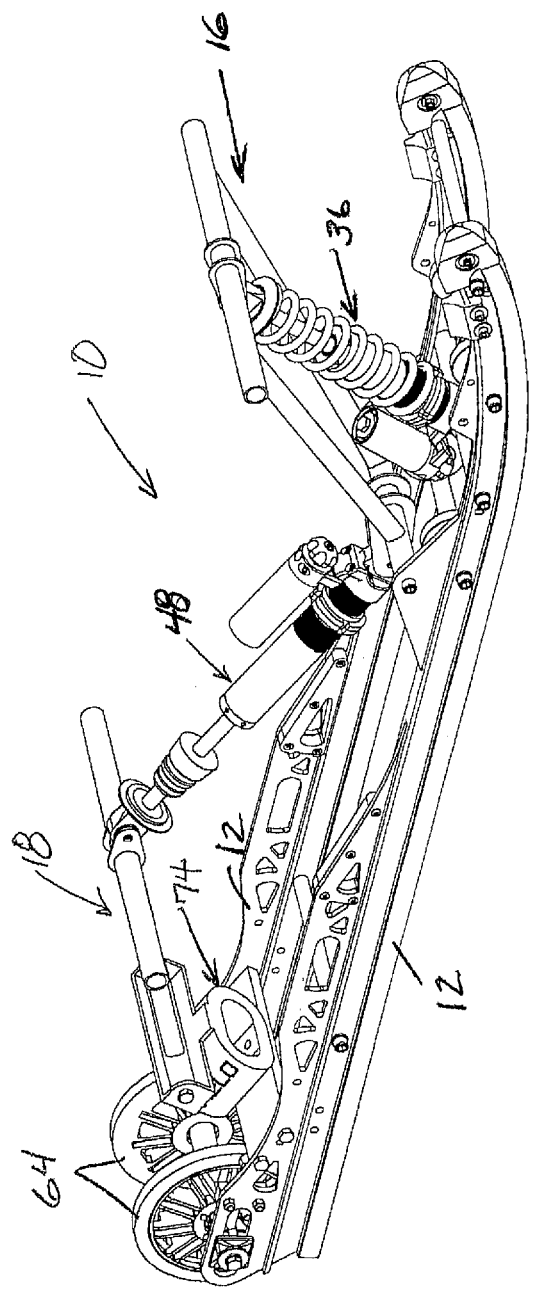
FIG. 16 is a perspective view of the suspension assembly showing an alternate orientation of the wire rope mount.

In FIGS. 6-11, the wire rope mount element 76 of the wire rope mount 74 has a longitudinal axis which is oriented transversely to the pivot axis A and the ground contacts 12. However, the present disclosure contemplates that the wire rope mount 74 may be alternatively oriented in the suspension assembly 10. For example, the longitudinal axis of the wire rope element 76 in wire rope mount 74 could be oriented at any direction in the suspension assembly 10 such as vertically or angularly (FIG. 16) relative to the longitudinal pivot axis of the snowmobile or along the longitudinal pivot axis of the snowmobile.

Further, it is envisioned that more than one wire rope mount 74 may be mounted in the suspension assembly 10. For example, the wire rope mount 74 could be mounted to a front end of a swing arm 16, 18, or another portion of the suspension assembly 10, such as between the chassis and one or more of the swing arms 16, 18. The wire rope mount 74 may have further application in other vehicles such as off-road vehicles, all terrain vehicles, snow bikes and the like.

It should be further understood that the wire rope mount 74 can be mounted on at least one of the front end portion and the rear end portion of a unitary swing arm such as disclosed in the aforementioned U.S. Patent Application Publication No. 2015/0034404 to provide enhanced snowmobile performance characteristics as discussed above.

Figure 13:
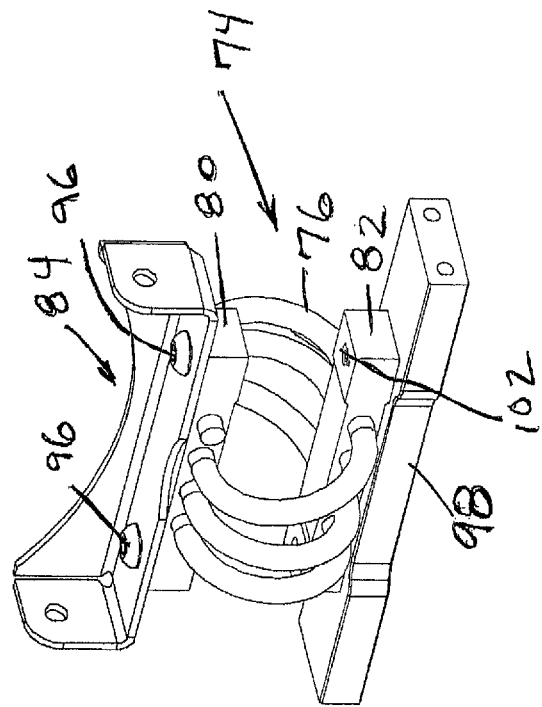
FIG. 13 is an isolated view of the wire rope mount shown in FIG. 11.
Figure 12:
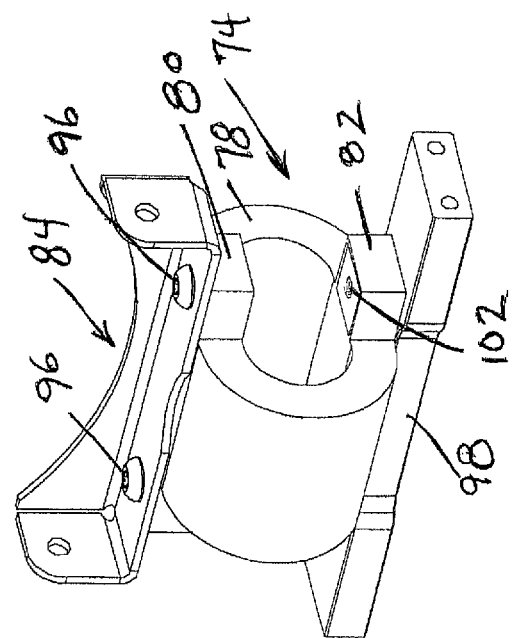
FIG. 12 is an isolated view of the wire rope mount shown in FIG. 6.

The wire rope mount 74 is conveniently provided as a bolt-on modification kit to the suspension assembly 10 of FIGS. 1-5 as illustrated in FIGS. 12 and 13.

Figure 15:
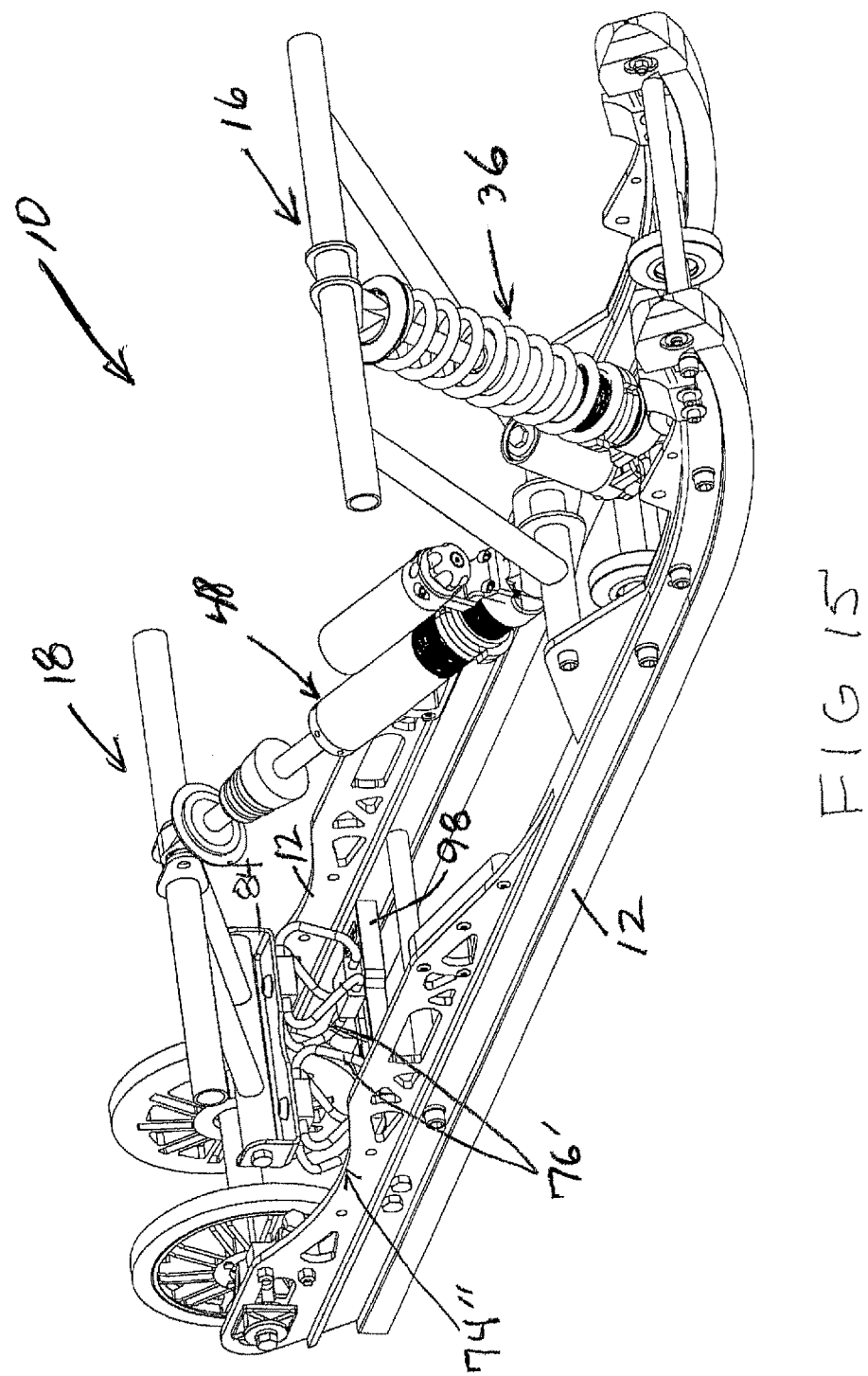

FIG. 14 illustrates a suspension assembly 10 provided with the wire rope mount 74 shown in FIGS. 6-10 as well as an additional wire rope mount 74' which is mounted between the rear end portion and lower cross shaft 24 of the front swing arm 16 and the ground contacts 12. The wire rope mount 74' permits at least rotation of the front swing arm 16 about the pivot axis A. FIG. 15 illustrates a suspension assembly 10 provided with a wire rope mount 74" formed by a pair of wire rope elements 76' mounted in spaced side-by-side relationship between the cradle 84 and the mounting bar 98 at the rear end portion of the rear swing arm 18.

In the above description certain terms have been used for brevity, clarity and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives and modifications are possible within the scope of the appended claims.

What is claimed is:

1. A suspension assembly adapted for use with a vehicle having a chassis enclosing a drive system for rotatably driving a closed-loop track, the suspension assembly comprising at least one elongated ground contact engaged with the closed-loop track, an elongated swing arm angularly disposed in the closed-loop track, the swing arm extending between a front end portion adapted to be coupled to the chassis, and a rear end portion coupled to the at least one ground contact, and a mounting arrangement coupled to the swing arm for permitting at least rotation of the swing arm about a pivot axis extending longitudinally of the at least one ground contact, wherein the mounting arrangement comprises a wire rope mount;
wherein the wire rope mount includes at least one resilient wire rope element, a first mounting element connected to an upper end of the at least one wire rope element and attached to the rear end portion of the swing arm, and a second mounting element connected to a lower end of the at least one wire rope element and attached to the at least one ground contact;
wherein the upper end of the wire rope mount includes an upper mounting block, and the lower end of the at least one wire rope element includes a lower mounting block; and
wherein the first mounting element is a cradle which receives the rear end portion of the swing arm, and is connected to the upper mounting block of the at least one wire rope element.

2. The suspension assembly of claim 1, wherein the at least one wire rope element is encapsulated in an elastomeric material.

3. The suspension assembly of claim 1, wherein the wire rope element has a longitudinal axis oriented either transversely or angularly relative to the pivot axis and the at least one ground contact.

4. The suspension assembly of claim 1, wherein the at least one wire rope element is configured for compression responsive to loading on the swing arm, and configured for expansion responsive to release of loading on the swing arm.

5. The suspension assembly of claim 1, wherein the second mounting element is a mounting bar having outer ends fixed to the at least one ground contact, and an upper surface joined to the lower mounting block of the wire rope mount.

6. The suspension assembly of claim 1, wherein the swing arm is defined by a front swing arm and a rear swing arm, each of the swing arms extending downwardly and rearwardly in the closed-loop track.

7. The suspension assembly of claim 6, wherein the wire rope mount includes at least a first wire rope mount coupled between the rear swing arm and the at least one ground contact, and at least a second wire rope mount coupled between the front swing arm and the at least one ground contact.

8. A suspension assembly adapted for use with a vehicle having a chassis enclosing a drive system for rotatably driving a closed-loop track, the suspension assembly comprising at least one elongated ground contact engaged with the closed-loop track, an elongated swing arm angularly disposed in the closed-loop track, the swing arm extending between a front end portion adapted to be coupled to the chassis, and a rear end portion coupled to the at least one ground contact, and a mounting arrangement coupled to the swing arm for permitting at least rotation of the swing arm about a pivot axis extending longitudinally of the at least one ground contact, wherein the mounting arrangement comprises a wire rope mount;
wherein the wire rope mount includes a pair of wire rope elements mounted in side-by-side relationship between the swing arm and the at least one ground contact.

9. A kit adapted for use with a suspension assembly for a vehicle having a chassis enclosing a drive system for rotatably driving a closed-loop track, the suspension assembly including at least one elongated ground contact engaged with the closed-loop track, an elongated swing arm angularly disposed in the closed-loop track, the swing arm extending between a front end portion coupled to the chassis, and a rear end portion coupled to the at least one ground contact, the kit comprising:
at least one wire rope element;
a first mounting element connected to an upper end of the at least one wire rope element, and adapted to be attached to the rear end portion of the swing arm; and
a second mounting element connected to a lower end of the at least one wire rope element, and adapted to be attached to the at least one ground contact;
wherein the at least one wire rope element is a pair of wire rope elements.

10. The kit of claim 9, wherein the at least one wire rope element is encapsulated in an elastomeric material.

* * * * *